March 28, 1961 N. SWERDLOW 2,977,404
ELECTRIC BUS DUCT
Filed March 7, 1960

INVENTOR.
NATHAN SWERDLOW
BY
William Friedman
ATTORNEY

United States Patent Office 2,977,404
Patented Mar. 28, 1961

2,977,404

ELECTRIC BUS DUCT

Nathan Swerdlow, Philadelphia, Pa., assignor to General Electric Company, a corporation of New York Filed Mar. 7, 1960, Ser. No. 13,057

6 Claims. (Cl. 174—99)

This invention relates to an electric bus and, more particularly, to a bus of the type in which all of the usual phase conductors are mounted within a single metallic enclosure. Buses of this type are commonly referred to as non-segregated phase buses.

It is usually desirable that any fault occurring within an enclosed bus be a fault to ground rather than a fault between the phases of the bus. This is the case because faults to ground ordinarily result in substantially lower short circuit currents than do phase-to-phase faults, and, hence, are less likely to cause damage to the bus or connected apparatus.

Usually the type of electrical failure to which a bus is most susceptible is a breakdown along the surface of an insulator or some insulating material disposed within the bus. If such a breakdown does occur, it is important that it not result in a phase-to-phase fault.

Accordingly, an object of my invention is to construct a non-segregated phase bus in such a manner that any fault occurring in the bus as a result of failure along an insulating surface will be a fault to ground rather than between phases.

Another object is to construct a bus in the manner set forth in the immediately preceding paragraph and also in such a manner that the phase conductors can be readily secured to form a preassembled unit prior to being incorporated into their common enclosure.

In carrying out my invention in one form, I provide a tubular metallic housing and a plurality of conductor supports located at positions longitudinally spaced-apart along the length of the housing. Each of the supports comprises a grounded metallic pillar having a base and a free end at its respective opposite ends. The base of each of the pillars is attached to the housing in such a position that the free ends of the pillars are located generally along the central longitudinal axis of the housing.

A plurality of insulating posts are provided at the free end of each pillar and are mounted on the free end of the pillar in such a manner that they extend radially outward from said longitudinal axis in angularly-spaced relation about said axis. Mounted on these insulating posts at their ends opposite to the location of the metallic pillar are the conductors of the bus. These conductors are secured to the insulating posts in spaced-apart relationship to each other and to the surrounding metallic housing.

For a better understanding of my invention, reference may be had to the following description taken in conjunction with the accompanying drawing, wherein.

Figure 1:
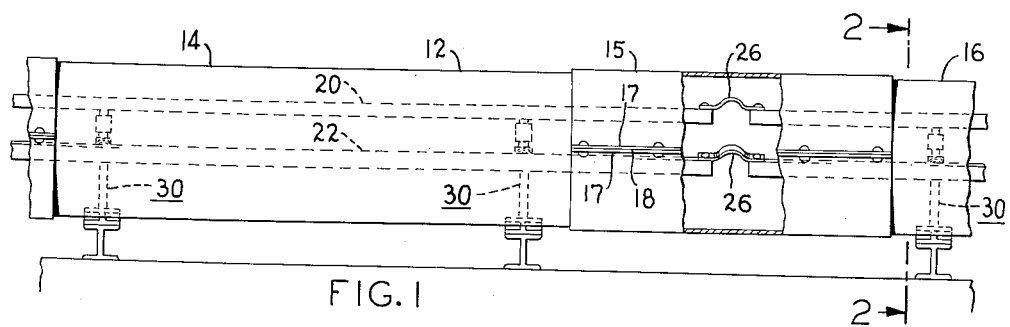
Fig. 1 is a side elevational view partly in section showing an electric bus embodying one form of my invention.

Referring now to Fig. 1, the bus shown therein comprises a metallic housing 12 formed from a plurality of tubular sections 14, 15, and 16 disposed in axially aligned relationship. The tubular sections 14 and 16 are shown as being main duct sections, and section 15 is shown as being an auxiliary duct section interconnecting the adjacent ends of the main sections. The auxiliary duct section 15 is preferably formed from two semi-cylindrical halves having radially-extending flanges 17 bolted together along a longitudinal seam such as 18 so as to embrace the ends of the main sections 14 and 16.

Supported within the metallic housing 12 are three rigid conductors 20, 22, and 24, preferably constituting the three separate phases of a three-phase alternating current circuit. Each of these conductors is formed from a plurality of longitudinally-spaced sections electrically connected together in end-to-end relationship by means of suitable braids such as shown at 26 of Fig. 1. These braided joints of the bus are located within the split auxiliary sections, such as 15 of Fig. 1, so that easy access may be had to the joints for assembly and inspection purposes.

Figure 2:
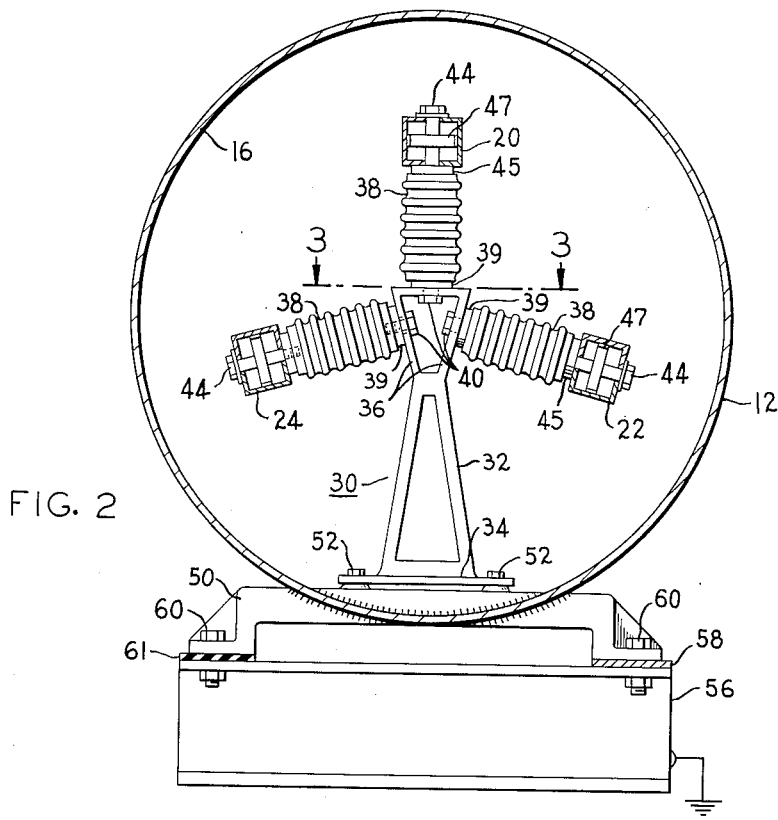
Fig. 2 is a sectional view of the bus of Fig. 1 taken along the line 2—2 of Fig. 1.
Figure 3:
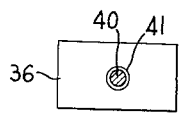
Fig. 3 is an enlarged sectional view taken along the line 3—3 of Fig. 2.

The conductors 20, 22, 24 are supported at spaced-apart locations along the length of the enclosure of the housing 12 by means of supports 30, each of which is located within a main duct section, such as 14 and 16. Preferably, each longitudinally-spaced section of the conductors is supported at two longitudinally spaced-apart locations by longitudinally-spaced supports 30. Each of these supports 30 is of the general configuration and design illustrated in Fig. 2. More specifically, the support 30 comprises a metallic pillar 32 having a base 34 at one of its ends and a free end 36 at its opposite end. The free end 36 of each support is located generally at the longitudinal central axis of the housing 12 and comprises a hollow portion of generally triangular configuration. The three angularly-disposed walls of this end portion bound a hollow central region. Attached to the outside surfaces of the three walls of this triangular portion are three conventional insulating posts 38, preferably of porcelain. Each of these insulating posts 38 comprises an end fixture 39 suitably bonded to the porcelain body of the insulating posts and abutting against the outer surface of one of the walls of the triangular end portion 36. A bolt 40 extends through a suitable opening 41 in the mounting wall of part 36 and is threaded into the end fixture 39 to attach the insulating post 38 to the pillar 32. In Fig. 3 this opening 41 is shown as a circular hole extending through the wall 36.

The insulating posts 38 radiate from the central longitudinal axis of the housing 12 and preferably are angularly spaced apart by greater than 90 degrees. The generally triangular configuration of the free end 36 of the pillar 32 enables correct positioning of the insulating post 38 in the desired locations to be achieved without any special adaptors inasmuch as the outer walls of the triangular ends 36 are sloped to provide for the desired correct positioning. To correctly position the insulating posts on the supporting pillar 32, the end fixture 39 of an insulating post is simply placed against an outer surface of the triangular portion of the pillar; a bolt is slipped into place from the hollow of the triangular portion, and is then tightened by a wrench or the like applied to the head of the bolt located in the hollow. The hollow construction facilitates securing the insulators in position inasmuch as the hollow allows the bolts to be easily slipped into place with their heads readily accessible for tightening.

Figure 4:
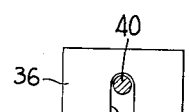
Fig. 4 is a similar sectional view of a modified form of the invention.

As an additional aid to assembling the insulating posts 38 on the supporting pillar 32, the openings 41 that receive the bolts 40 can be formed as open-ended slots, such as shown in Fig. 4. Each of these slots extends longitudinally of the bus and allows the bolt 40 to be first threaded into the end plate 39 of the insulator prior to fastening the insulator to the pillar 32. The insulator 38 with the bolt partially threaded into its end plate 39 is then slipped on to the pillar 32 in a direction longitudinally of the bus with the slot 41 receiving the shank of the bolt, after which the bolt is tightened. To assure that the bolt 40 will not accidentally slide out of the slot 41, the other one of the two longitudinally-spaced pillars 32 that support each section of bus conductor is provided with corresponding slots opening in an opposite direction longitudinally of the bus.

The conductors 20, 22, and 24 are supported on their respective insulating posts in any suitable manner, as, for example, by means of a mounting bolt such as 44 aligned with each insulator and threaded into end fixture 45 bonded to the outer end of the insulating post. Preferably, each conductor comprises a pair of channels disposed with their flanges facing each other, and the mounting bolts 44 are located between these channels. The channels are shown secured together by means of suitable straps 47. Preferably, the conductors 20, 22, and 24 are substantially equally spaced from the central axis of the enclosure 12, and from the pillar 32 so as to most advantageously utilize the insulating space available within the bus.

For supporting both the housing 12 and the supports 30, a transverse supporting section 50 is provided in longitudinal alignment with each support 30. This supporting section 50 is preferably a casting of U-shaped cross-section extending in a chordal direction across the lower portion of the housing 12 and fitted into a suitable slot provided in the housing 12. The walls of the housing are attached to the supporting section 50 by suitable means such as a welded joint provided around the perimeter of the slot that receives the section 50. The base 34 of the pillar 32 is attached to this supporting section 50 by means of suitable bolts 52 extending through flanges constituting a portion of the base 34. The transverse supporting sections 50 are shown supported on transverse I-beams 56 respectively disposed in alignment with the sections 50. Preferably, one of these I-beams 56 and a supporting unit 30, 50 mounted thereon is located at each of the opposite ends of each main duct section so as to provide the desired support for the housing 12 and the conductors 20, 22, and 24.

The pillar 32, the housing 12, and the transverse sections 50 are all at ground potential by virtue of an electrical connection provided between each of the transverse supporting sections 50 and the grounded I-beams 56. This connection preferably comprises a metallic plate 58 disposed between one end of each of the sections 50 and its supporting I-beam 56 and bolts such as 60 clamping the supporting section 50 to the I-beam 56. If desired, an insulating pad 61 can be disposed between the other end of the supporting section 50 and the I-beam 56, as shown in Fig. 2, to prevent eddy currents from circulating over a path including the I-beam 56 and the supporting section 50.

One of the objects of the present invention is to assure that any electrical failure occurring through breakdown along the surface of an insulator be a failure to ground rather than to another phase. This object is attained in the disclosed bus structure by virtue of the fact that any breakdown occurring along an insulating surface would be a breakdown to the grounded metallic pillar 32 inasmuch as a portion of the pillar is interposed in all those possible breakdown paths between the conductors that extend along the surfaces of insulators 38. Thus, such a failure (i.e., along an insulating surface) would be to ground rather than to an adjacent phase conductor, as is desired. It is likewise desirable that any breakdown occurring from one of the conductors through the surrounding air space be to ground rather than between phases. Assurance that this will be the case is obtained by providing a substantially greater spacing between the phase conductors themselves than between each phase conductor and the grounded metallic housing 12.

It is to be noted that my conductors 20, 22, and 24, my insulators 38, and my metallic pillar 32 can all be secured together to form a self-sustaining preassembled unit outside of the housing 12. This preassembled unit can then be easily slipped into the housing 12 and bolted in place by means of the bolts 52. The fact that the internal parts can be assembled prior to incorporation into the bus materially facilitates the assembly operation inasmuch as the various components and joints are much more accessible than if they were enclosed during the assembly operation.

While I have shown and described a particular embodiment of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. An electric bus comprising a tubular metallic housing, a plurality of conductor supports located at positions longitudinally spaced-apart along the length of said housing, each of said supports comprising a grounded metallic pillar having a base and a free end at its respective opposite ends, means for attaching the base of each of said metallic pillars to said housing in such positions that the free ends of said pillars are located generally along the central longitudinal axis of said housing, a plurality of insulating posts at the free end of each pillar extending radially outward from said longitudinal axis and disposed in angularly-spaced relationship about said axis, each of said posts having a pair of spaced-apart ends, means for mounting one end of each of said posts on said free end of said pillar, a plurality of substantially rigid conductors, means for mounting said conductors on the other ends of said insulating posts in spaced-apart relationship to each other and to said metallic housing, said pillars being so disposed that all possible breakdown paths extending between said conductors along the surface of any insulating material located between said conductors extends through one of said grounded metallic pillars.

2. The bus of claim 1 in which said insulating posts are angularly spaced from each other by greater than ninety degrees and in which said conductors are spaced from the central longitudinal axis of said housing by substantially equal amounts.

3. The bus of claim 1 in which said conductors are spaced from each other by amounts greater than the spacing between said housing and said conductors.

4. An electric bus comprising a tubular metallic housing, a plurality of metallic pillars located at positions longitudinally spaced-apart along the length of said housing, each of said pillars including a base at one of its ends and a portion of hollow triangular configuration at its other end, said portion of hollow triangular configuration comprising three walls angularly disposed relative to each other and bounding a hollow region, means for attaching the base of each of said pillars to said housing in such positions that the triangular-shaped end portions are located generally along the central longitudinal axis of said housing, a plurality of insulating posts at the free end of each pillar extending radially outward from said longitudinal axis and disposed in angularly-spaced relationship about said axis, each of said posts having a pair of spaced-apart ends, means for mounting respectively one end of each of said insulating posts on one of said walls comprising fastening means extending through said one wall into the hollow region bounded by said walls, a plurality of substantially rigid conductors, means for mounting said conductors on the other ends of said insulating posts in spaced-apart relationship to each other and to said metallic housing, said pillars being so disposed that all possible breakdown paths extending between said conductors along the surface of any insulating material located between said conductors extends through one of said grounded metallic pillars.

5. An electric bus comprising a tubular metallic housing, a plurality of metallic pillars located at positions longitudinally spaced-apart along the length of said housing, each of said pillars including a base at one of its ends and a portion of hollow triangular configuration at its other end, said portion of hollow triangular configuration comprising three walls angularly disposed relative to each other and bounding a hollow region, means for attaching the base of each of said pillars to said housing in such positions that the triangular-shaped end portions are located generally along the central longitudinal axis of said housing, a plurality of insulating posts at the free end of each pillar extending radially outward from said longitudinal axis and disposed in angularly-spaced relationship about said axis, each of said posts having a pair of spaced-apart ends, means for mounting respectively one end of each of said insulating posts on one of said walls comprising fastening means extending through said one wall into the hollow region bounded by said walls, a plurality of substantially rigid conductors, means for mounting said conductors on the other ends of said insulating posts in spaced-apart relationship to each other and to said metallic housing.

6. The bus of claim 5 in which said walls are provided with open-ended slots extending longitudinally of the bus for receiving said fastening means, the slots in adjacent pillars opening in longitudinally opposite directions.

No references cited.